(12) United States Patent
Nakajima et al.

(10) Patent No.: US 11,822,206 B2
(45) Date of Patent: Nov. 21, 2023

(54) OPTICAL SIGNAL PROCESSING DEVICE

(71) Applicant: Nippon Telegraph and Telephone Corporation, Tokyo (JP)

(72) Inventors: Mitsumasa Nakajima, Musashino (JP); Masanobu Inubushi, Musashino (JP); Takashi Go, Musashino (JP); Toshikazu Hashimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 783 days.

(21) Appl. No.: 16/965,090

(22) PCT Filed: Feb. 20, 2019

(86) PCT No.: PCT/JP2019/006353
§ 371 (c)(1),
(2) Date: Jul. 27, 2020

(87) PCT Pub. No.: WO2019/167759
PCT Pub. Date: Sep. 6, 2019

(65) Prior Publication Data
US 2021/0026220 A1 Jan. 28, 2021

(30) Foreign Application Priority Data
Feb. 27, 2018 (JP) ................. 2018-033746

(51) Int. Cl.
*G02F 1/35* (2006.01)
*G06E 3/00* (2006.01)
(52) U.S. Cl.
CPC .............. *G02F 1/35* (2013.01); *G06E 3/00* (2013.01)
(58) Field of Classification Search
CPC ...................................... G02F 1/35; G02F 3/00
See application file for complete search history.

(56) References Cited

U.S. PATENT DOCUMENTS

2012/0141067 A1* 6/2012 Sakamaki .............. H04B 10/60
385/31

FOREIGN PATENT DOCUMENTS

JP 2018-200391 A 12/2018

OTHER PUBLICATIONS

Herbert Jaeger et al., *Harnessing Nonlinearity: Predicting Chaotic Systems and Saving Energy in Wireless Communication*, Science, vol. 304, No. 5667, 2004, pp. 78-80.
(Continued)

*Primary Examiner* — Joseph P Martinez
(74) *Attorney, Agent, or Firm* — Workman Nydegger

(57) ABSTRACT

There is provided an optical signal processing device capable of RC in a complex space using optical intensity and phase information. An optical modulator controlled by an electric signal processing circuit modulates laser light, which is emitted from a laser light source, at a modulation period either or both of the intensity and phase values of the optical electric field. On the other hand, an input signal is also modulated by the optical modulator at a modulation period in the time domain so as to be an input signal. The converted input signal passes through an optical transmission path and enters an optical circulation circuit via an optical coupler. Part of the circulating light is branched into two by an optical coupler, and the branched light is converted into a complex intermediate signal at a coherent optical receiver. This complex intermediate signal demodulated at the coherent optical receiver is computed at an electric signal processing circuit, and thereby the operation as RC can be performed.

8 Claims, 8 Drawing Sheets

(56) References Cited

OTHER PUBLICATIONS

Daniel Bruner et al., *Parallel Photonic Information Processing at Gigabyte per Second Data Rates Using Transient States*, Nature Communications, Jan. 15, 2013, vol. 4, No. 1364, pp. 1-7.
Quentin Vinckier et al., *High-Performance Photonic Reservoir Computer Based on a Coherently Driven Passive Cavity*, Optica, vol. 2, No. 5, May 2015, pp. 438-446.
Govind P. Agrawal, *Self-Phase Modulation and Spectral Broadening of Optical Pulses in Semiconductor Laser Amplifier*, IEEE Journal of Quantum Electronics, vol. 25, No. 11, Nov. 1989, pp. 2297-2306.
International Search Report and Written Opinion dated Apr. 23, 2019, issued in PCT Application No. PCT/JP2019/006353, filed Feb. 20, 2019.

\* cited by examiner

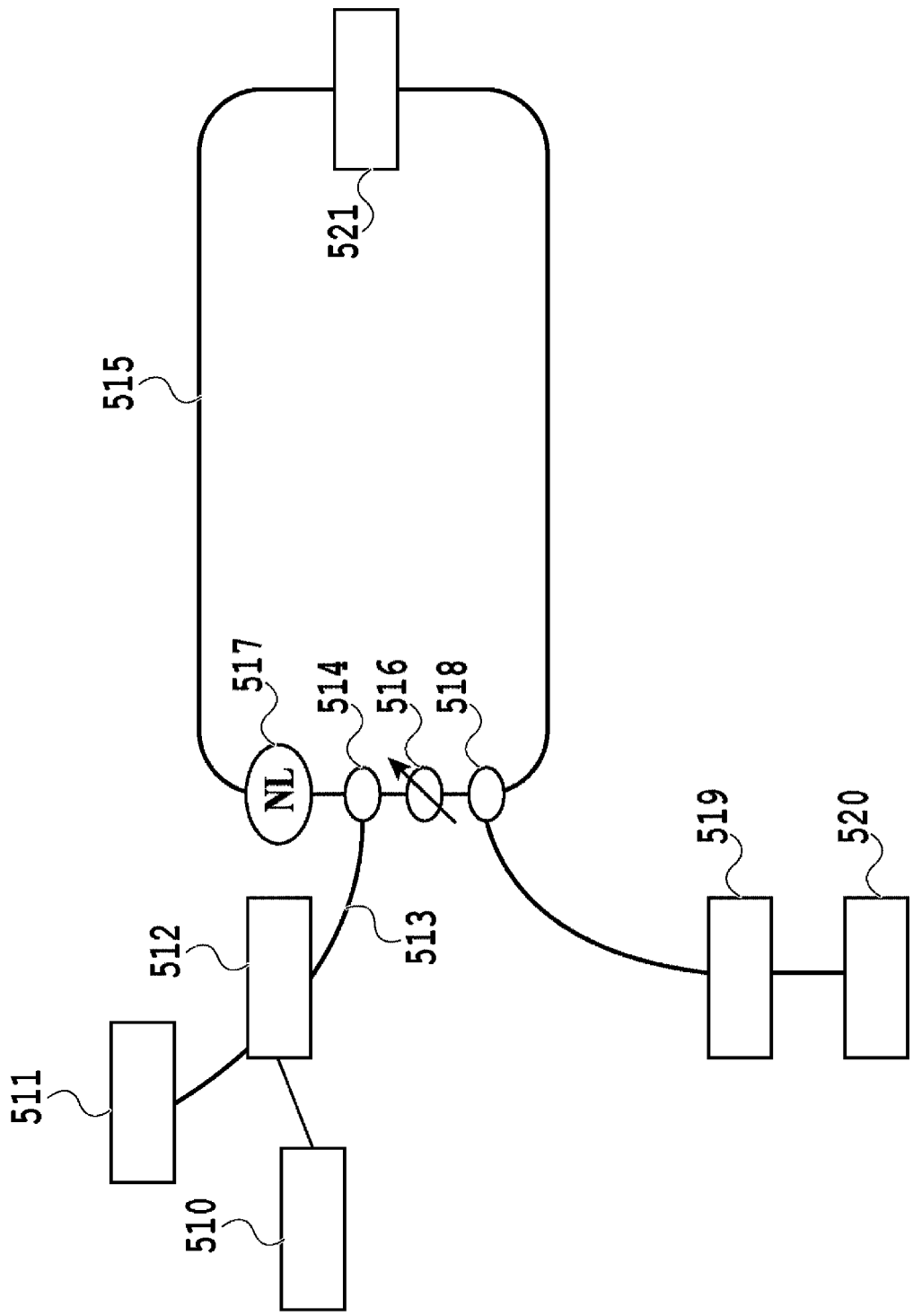

OPTICAL SIGNAL PROCESSING DEVICE

TECHNICAL FIELD

The present invention relates to an optical signal processing device capable of reservoir computing in a complex number domain.

BACKGROUND ART

Attention has been attracted to machine learning with neural networks (NN) modeled after brain information processing. NN is a large-scale nonlinear network in which many neurons with nonlinear responses are coupled by synapses, and in particular, deep learning with a hierarchical NN in which neurons are arranged in a multilayer form has widely been employed. To handle time series data, NN typically requires a recursive network structure capable of referring to past information. Such NN is called recurrent neural network (RNN), which typically uses a network structure having feedback coupling between hierarchical NN layers. Although RNN has widely been employed for learning and processing of time series data such as sound recognition and sensing data, such RNN is disadvantageous in that, since synaptic coupling explodes with increasing the numbers of layers and neurons, more time is required for computation.

As a method for solving such a problem, an optical computing technique modeled after cerebellar information processing has been proposed in recent years, which is called reservoir computing (RC) (see Non-Patent Literatures 1 and 2).

FIG. 1($a$) is a schematic configuration of a typical RC circuit, and FIG. 1($b$) is a schematic configuration of a conventional RC circuit. These configurations consist of an input layer 101 in which an input signal couples with each neuron, an intermediate layer 102 in which each neuron couples with each other, and an output layer 103 in which signals of each neuron are added up and output. When an input signal u(n) is input to the input layer 101, an output signal y(n) from the output layer 103 is determined by Formulas (1) and (2) below.

Formula 1

$$x_i(n) = f\left\{\sum_j^N \Omega_{ij} x_i(n-1) + m_i \cdot u(n)\right\} \quad (1)$$

Formula 2

$$y(n) = \sum_i^N \omega_i x_i(n) \quad (2)$$

Note that N is the number of neurons, $x_i(n)$ is the state of the i-th neuron at the time step n, $\Omega_{ij}$ is a coefficient representing mutual coupling between the neurons, $m_i$ is a coefficient representing coupling of the input signal with the neurons, and $\omega_i$ is a coefficient representing coupling intensity of each neuron to the output. Furthermore, f(•) represents the nonlinear response at each neuron, in which, for example, tan h(•) is frequently used.

RC significantly differs from a typical RNN in that networks of the input layer 101 and the intermediate layer 102 are fixed, and a variable used for learning is only a weight coefficient of the output layer 103, that is, coupling intensity $\omega_i$ of each neuron to the output. This method can greatly reduce variables to be learned, which thus has a great advantage in time series learning in which data is huge and high-speed processing is required.

Furthermore, this method is also advantageous in terms of storage method of past information. A signal entered into RC continues to drift for some time between neurons present in the intermediate layer 102. This means that RC itself retains short-term storage capacity and information interchange capacity. Accordingly, RC does not require operations of a typical RNN such as storing signals at previous time steps to an external memory and again referring to the data stored in the memory.

RC has been reported on its simple implementation using time delay as in FIG. 1($b$) and thus gained attention (Non-Patent Literature 2). In this method, a loop within a delay time is divided at certain intervals using a nonlinear element with time delay, and then, instantaneous optical intensities at respective points on the delay line are considered to be in virtual node states of the network, thereby forming a virtual network. Accordingly, unlike a conventional NN, no optical wiring is needed for many nonlinear elements, which is excellent in that an RC network can be implemented only by a single optical delay line and nonlinear element.

CITATION LIST

Non-Patent Literature

Non-Patent Literature 1: H. Jaeger et al., "Harnessing Nonlinearity: Predicting Chaotic Systems and Saving Energy in Wireless Communication," Science 304, 78 (2004)

Non-Patent Literature 2: D. Brunner et al., "Parallel photonic information processing at gigabyte per second data rates using transient states," Nature Communications 4, Article number: 1364 (2013)

Non-Patent Literature 3: Q. Vinckier et al., "High-performance photonic reservoir computer based on a coherently driven passive cavity," Optica, Vol. 2, No. 5, pp. 438-446 (2015)

Non-Patent Literature 4: Govind P. Agrawal et al., "Self-Phase Modulation and Spectral Broadening of Optical Pulses in Semiconductor Laser Amplifiers," IEEE JOURNAL OF QUANTUM ELECTRONICS, Vol. 25, No. 11, pp. 2297-2306 (1989)

SUMMARY OF THE INVENTION

Technical Problem

However, RC by a conventional optical implementation method generates the input signal u(n) and the output signal y(n) by signal processing using an intensity-modulation/direct-detection (IM/DD) method, which causes a problem in which only intensity information is used for information processing and phase information is lost. Therefore, information expression capacity inherent in optical waves has not been utilized sufficiently.

The present invention has been made in view of such a problem, and it is an object of the present invention to provide an optical signal processing device capable of RC in a complex space using optical intensity and phase information.

Means for Solving the Problem

To solve the above problem, according to the present invention, there is provided an optical signal processing device including: a light source generating an optical signal; first optical modulation means for modulating at least one of intensity and phase of the optical signal at a first modulation period to generate a complex input signal; second optical modulation means for modulating the complex input signal in a time domain at a second modulation period that is shorter than the first modulation period; an optical circulation unit in which the modulated complex input signal circulates at a predetermined delay length; optical multiplex means for joining the modulated complex input signal in the optical circulation unit; a nonlinear response element giving nonlinearity to the optical signal circulating in the optical circulation unit; variable optical modulation means for modulating the optical signal circulating in the optical circulation unit; optical branch means for branching part of the optical signal circulating in the optical circulation unit; optical reception means for demodulating branched light output from the optical branch means to obtain a complex intermediate signal; and a signal processing circuit for weighting each of real and imaginary parts of the complex intermediate signal with any coupling weight and taking a sum to obtain a complex output signal, wherein the signal processing circuit changes the coupling weight so as to reduce an error between the complex output signal and a teacher signal.

In another aspect, the modulated complex input signal is a product of a complex vector having a period identical to the first modulation period and the complex input signal.

In another aspect, the predetermined delay length is 10 times or more the second modulation period.

In another aspect, optical pulse shaping means for optionally shaping an optical pulse of the optical signal circulating in the optical circulation unit, is further included.

In another aspect, the optical pulse shaping means includes: second optical branch means for N-branching (N is an integer of 2 or more) the optical signal circulating in the optical circulation unit; N delay lines being connected to each of N branches of the second optical branch means and having different delay lengths; control means for individually controlling intensity or phase of the optical signal passing through the N delay lines; and optical multiplex means for joining again the optical signal controlled by the control means.

Effects of the Invention

The present invention is capable of RC in a complex space using optical intensity and phase information, enabling to double the effective number of neurons as compared to the conventional one.

BRIEF DESCRIPTION OF DRAWINGS

FIG. 5 is a view showing a configuration of the optical signal processing device according to the second embodiment of the present invention.

DESCRIPTION OF EMBODIMENTS

Hereinafter, embodiments of the present invention will be explained in detail.

First Embodiment

Figure 2:
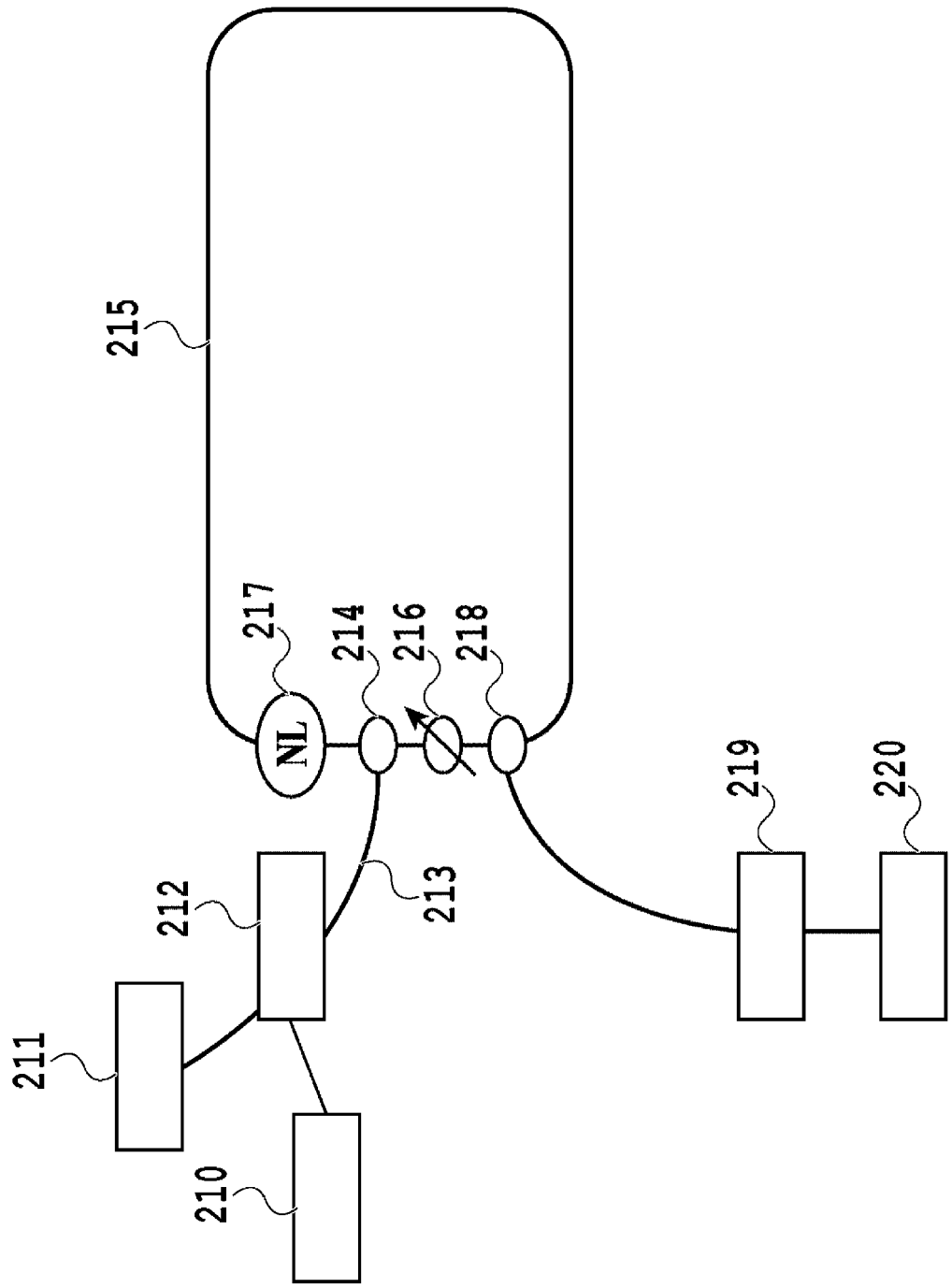
FIG. 2 is a view explaining an optical signal processing device according to the first embodiment of the present invention.

FIG. 2 shows a configuration of an optical signal processing device according to the first embodiment of the present invention. An optical signal processing device 200 of the first embodiment includes an optical modulator 212 controlled by an electric signal processing circuit 210. The optical modulator 212 modulates laser light, which is emitted from a laser light source 211, at a modulation period $T_1$ either or both of the intensity and phase values of the optical electric field. The complex amplitude of this optical electric field is an input signal u(t). On the other hand, the input signal u(t) is also modulated by the optical modulator 212 at a modulation period $T_2$ in the time domain so as to be an input signal u'(t).

The converted input signal u'(t) passes through an optical transmission path 213 and enters an optical circulation circuit 215 via an optical coupler 214. The optical circulation unit 215 is loaded with, in addition to the optical coupler 214, a variable attenuator 216, a nonlinear response element 217, and an optical coupler 218. By the optical coupler 218, part of the circulating light is branched into two. One branched light enters the optical coupler 214 via the variable attenuator 216 and circulates in the optical circulation circuit 215. The other branched light is converted into a complex intermediate signal x(t) at a coherent optical receiver 219. This complex intermediate signal x(t) demodulated at the coherent optical receiver 219 is computed by Formula (2) at an electric signal processing circuit 220. Thereby, the operation as RC can be performed.

The input signal u(t) is described by the following formula using a real part term $u^r(t)$ and an imaginary part term $u^i(t)$.

Formula 3

$$u(t)=u^r(t)+ju^i(t) \quad (3)$$

Note that $j=(-1)^{1/2}$. The signal light u(t) is modulated by some method at the modulation period $T_2$ ($T_2<T_1$) in the time domain so as to be u'(t) as in the following formula.

Formula 4

$$u'(t)=m(t)u(t) \quad (4)$$

Note that m(t) is a complex number generated by, for example, the optical modulator. Furthermore, u'(t) may be precomputed in the electric domain to cause the optical modulator 212 to directly modulate u'(t). FIG. 2 realizes the latter method using the electric signal processing circuit 210. The electric signal processing circuit 210 may have an AD conversion function that converts a value computed in the digital domain into an analog value, and in such a case of having the AD conversion function, Formula (4) may be computed in the digital domain. Apart from the modulation period $T_2$, m(t) has a repetition period $T_1$ in the following relationship.

Formula 5

$$m(t)=m(t+T_1) \quad (5)$$

Within a range of satisfying the restriction of Formula (5), m(t) can be any value. However, for further excellent learning performance, m(t) is preferred to take a variety of values and, for example, is generated by various pseudo-random number generation algorithms. Furthermore, to prevent divergence of responses, the range which can be taken by m(t) is desired to be restricted to $|m(t)| \leq 1$.

Note that, for the optical transmission path 213 and the optical circulation unit 215, for example, optical fibers and optical waveguides can be used. For the optical attenuator 216, a variable attenuator using a Mach-Zehnder interference system or an MEMS mirror can be used to adjust the input light amount. Furthermore, for the nonlinear response element 217, an optical amplifier such as an Er-doped fiber amplifier (EDFA) or a semiconductor optical amplifier (SOA) can be used. The selection of the nonlinear element does not limit the scope of the present invention, which may use, for example, a method that utilizes a laser chaotic oscillation disclosed in Non-Patent Literature 2. Furthermore, in a specific problem, a linear circuit as disclosed in Non-Patent Literature 3 may be configured, without using the nonlinear element 217.

Figure 3:
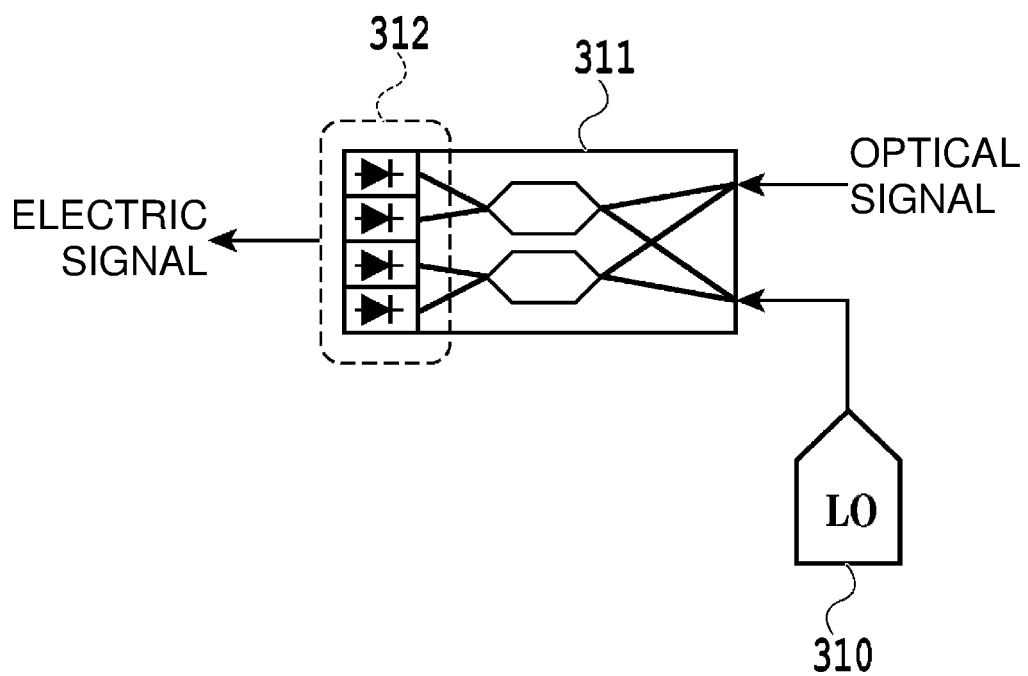
FIG. 3 is a view showing a configuration example of a coherent optical receiver.

FIG. 3 shows a configuration example of the coherent optical receiver 219. For the coherent optical receiver 219, a typical configuration including a local oscillator light source 310, a 90° hybrid optical circuit 311, and a balanced photodiode 312 can be used.

Learning generalization performance is determined by the diversity of the response of x(t). For securing this diversity, the circulation length $T_3$ of the circulation unit is desired to be set so as to satisfy the relationship of $T_2 \ll T_3$. More specifically, it is desired to be set to $T_3 \geq 10 T_2$.

The complex intermediate signal x(t) obtained at the coherent optical receiver 219 is given as a solution of the following evolution formula.

Formula 6

$$\frac{dx(t)}{dt} = \gamma f\{\alpha x(t-T_3) + \beta m(t)u(t)\} \quad (6)$$

Note that $\alpha$ is the product of the gain of the nonlinear response element 217 and the attenuation amount of the optical attenuator 216, and $\beta$ and $\gamma$ are the branch losses of the optical couplers 214 and 218. Here, where $T_3 = T_1$ for simplicity, x(t) is described by a time discretized by the sampling time $T_1$ as follows.

Formula 7

$$x_i(n)=f\{\alpha x_i(n-1)+m_i u(n-1)\} \quad (7)$$

Note that n represents the discretized time step. The subscript i means the i-th response of a signal within the sampling time $T_1$ and further divided by the time $T_2$. From the relationship described above, i ranges from 1 to $N=T_2/T_3$. The dynamics of Formula (7), from a comparison with Formula (1), correspond to those of reservoir computing in the case of having a diagonal matrix where all diagonal components of the coupling matrix $\Omega_{ij}$ are $j\Phi$ and having the number of neurons being N. That is, the electric signal processing circuit 220 computes Formula (2), and thereby the operation as RC can be performed. Furthermore, the electric signal processing circuit 220 may have an A/D conversion function that converts an analog input into a digital value, and in such a case of having the AD conversion function, computation of signals may be performed in the digital domain. Here, since this configuration handles input and output signals in a complex space, $x_i(n)$, y(n), and $\omega_i$ are all complex numbers.

Figure 1A:
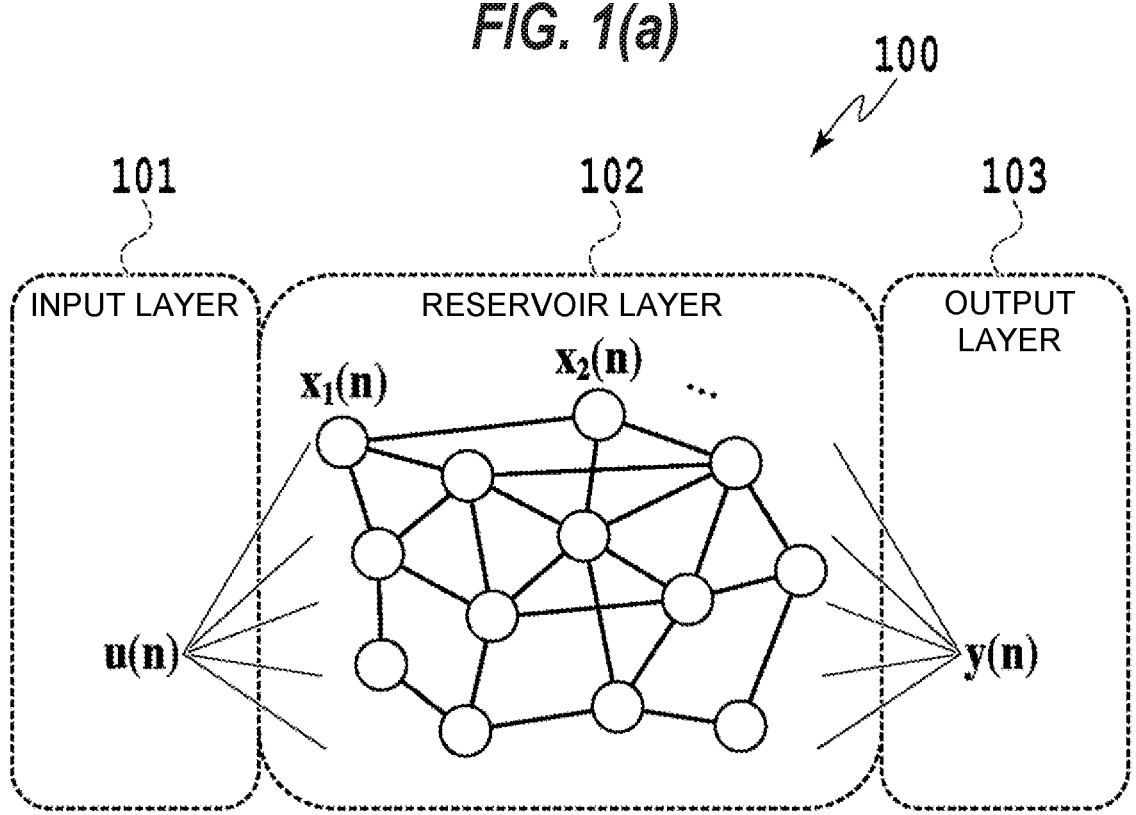
FIG. 1(a) is a view showing a schematic configuration of a typical RC circuit.
Figure 1B:
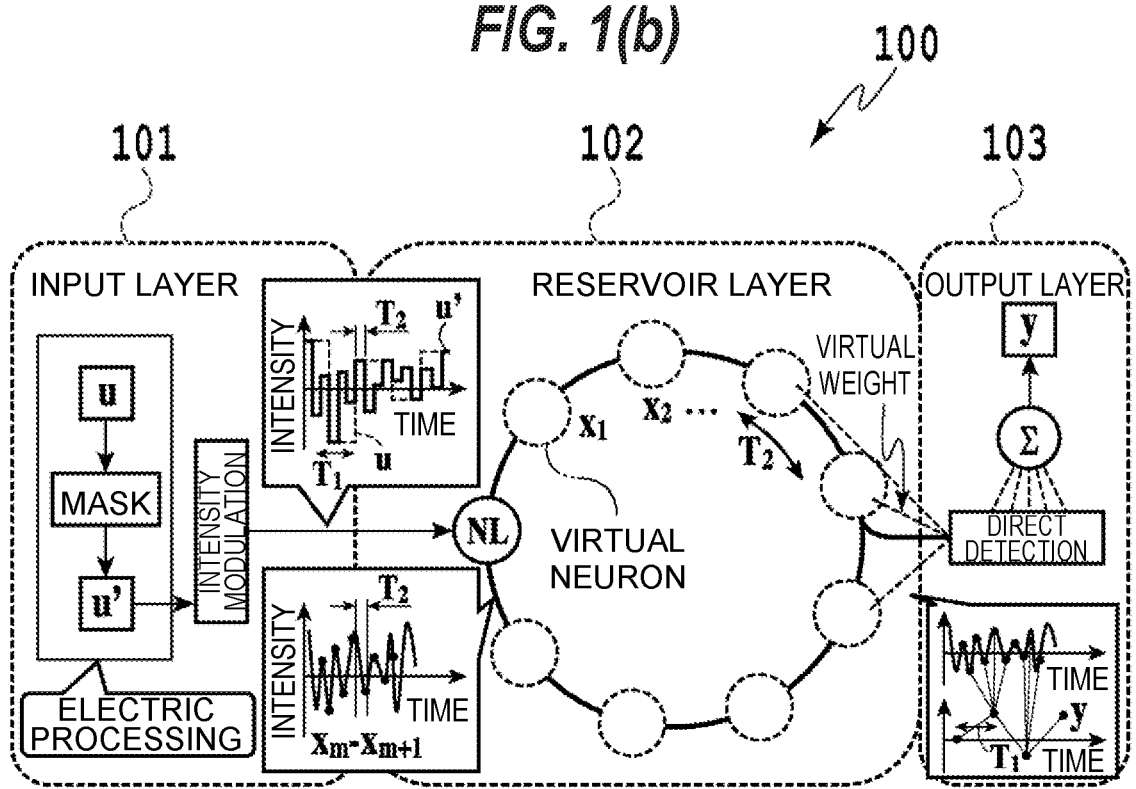
FIG. 1(b) is a view showing a schematic configuration of a conventional RC circuit.
Figure 4:
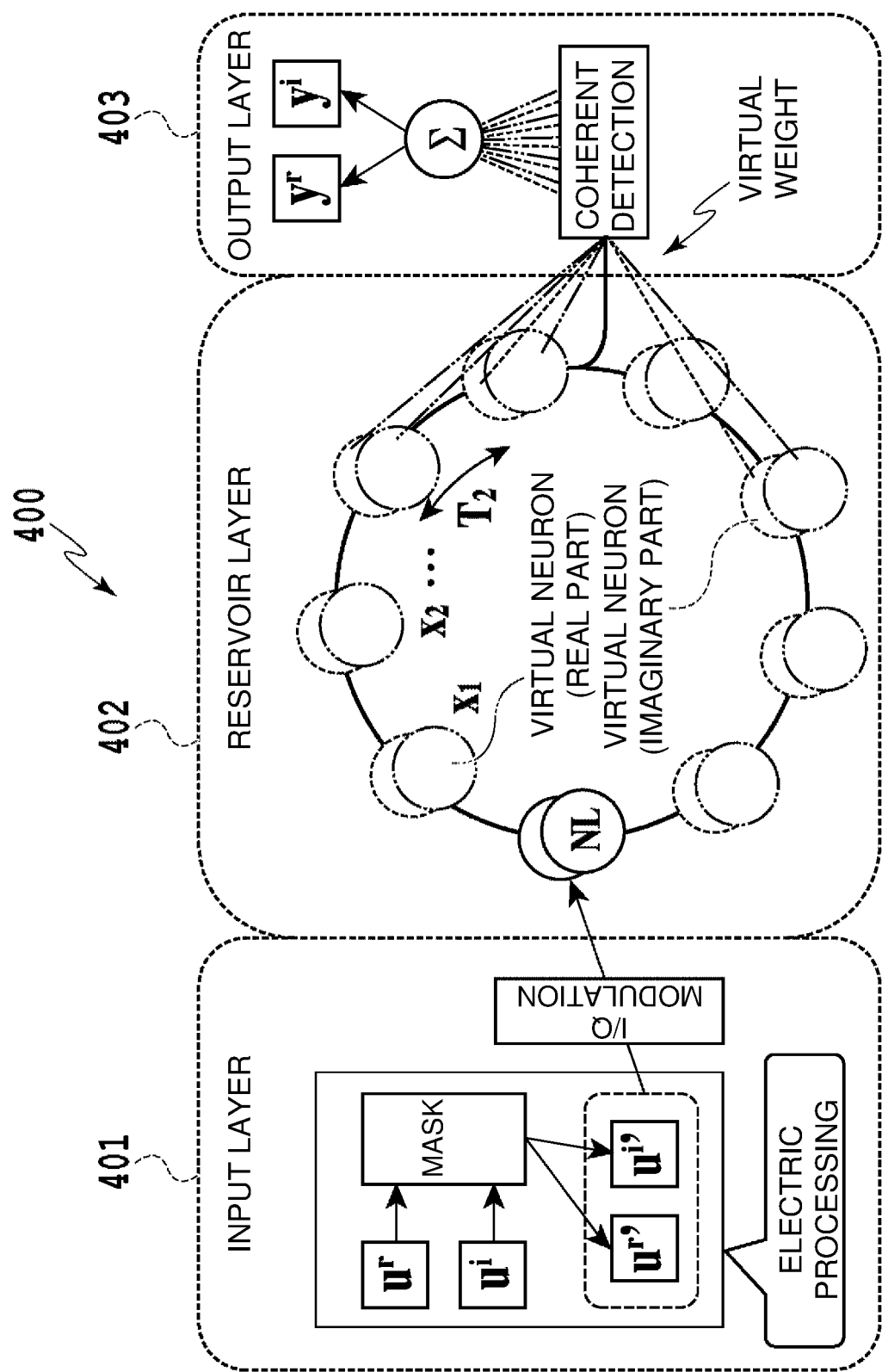
FIG. 4 is a view showing a schematic configuration of an RC circuit of the present invention.

FIG. 4 shows a schematic configuration of an RC circuit of the present invention. As shown in FIG. 4, an RC circuit 400 of the present invention differs from the conventional optical RC (FIG. 1(b)) in that the complex amplitude is the input signal at an input layer 401, and the complex amplitude demodulated at an output layer 403 from the signal output from an intermediate layer 402 can be output as the output signal. This exhibits an excellent function of doubling the effective number of neurons (the sum of the real and imaginary parts is 2N).

Second Embodiment

FIG. 5 shows a configuration of an optical signal processing device according to the second embodiment of the present invention. An optical signal processing device 500 of the second embodiment includes, similarly to the first embodiment, an optical modulator 512 controlled by an electric signal processing circuit 510. The optical modulator 512 modulates laser light, which is emitted from a laser light source 511, at a modulation period $T_1$ either or both of the intensity and phase values of the optical electric field. The complex amplitude of this optical electric field is an input signal u(t). The signal light u(t) is modulated into an input signal u'(t) at the optical modulator 512, and the converted input signal u'(t) passes through an optical transmission path 513 and enters an optical circulation circuit 515 via an optical coupler 514. The optical circulation unit 515 is loaded with, in addition to the optical coupler 514, a variable attenuator 516, a nonlinear response element 517, an optical coupler 518, and an optical pulse shaper 521. By the optical coupler 518, part of the circulating light is branched into two. One branched light enters the optical coupler 514 via the variable attenuator 516 and circulates in the optical circulation circuit 515. The other branched light is converted into a complex intermediate signal x(t) at a coherent optical receiver 519. The complex intermediate signal x(t) output from the coherent optical receiver 519 is computed by Formula (2) at an electric signal processing circuit 520. Thereby, the operation as RC can be performed. The second embodiment differs from the first embodiment in that the optical circulation unit 515 is provided with the optical pulse shaper 521.

Figure 6B:
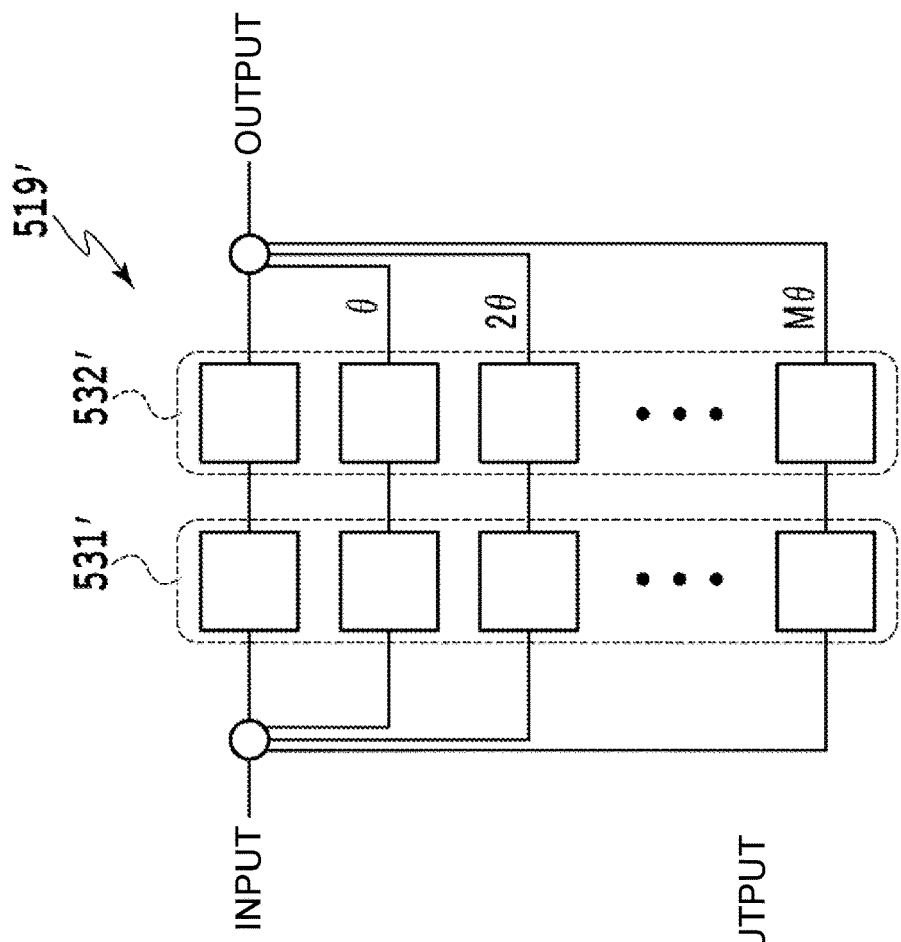
FIGS. 6(a) and (b) are views showing configuration examples of an optical pulse shaping unit 521.
Figure 6A:
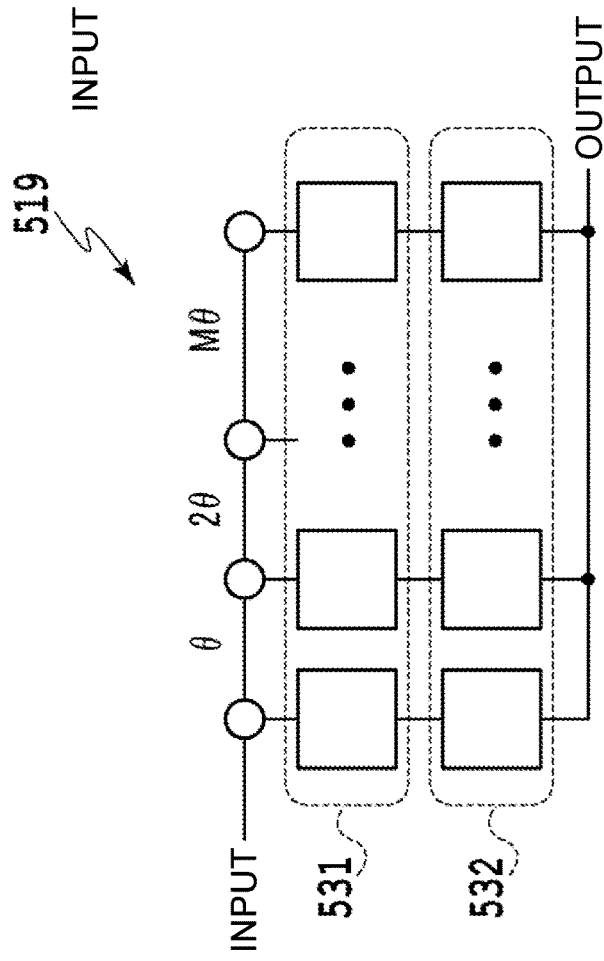

FIGS. 6(a) and (b) show equivalent configuration examples of the optical pulse shaping unit 521. The optical pulse shaping unit 521 includes an M-stage finite impulse response (FIR) filter connected by delay lines of $\theta$, $2\theta, \ldots, M\theta$ ($\theta \leq T_1$) and uses phase shifters 531 and 531' and variable attenuators 532 and 532' to give a weight $\mu_j$ to each time component within one pulse of the input signal u(t), that is, each delay line. It is desired to be set to $\theta = T_1$. The weight $\mu_j$ of each delay line is a complex number.

When the input signal u(t) modulated at the modulation period T from the optical system as described above is entered into the optical pulse shaper, the optical signal branched by the optical coupler 518 and going to the optical pulse shaper has a time response waveform x(t) described by the following formula.

Formula 8

$$\frac{dx(t)}{dt} = \gamma f\left\{\sum_{j=1}^{M} \alpha\mu_j x(t - T_3 - (M-j)T_1) + \beta m(t)u(t)\right\} \quad (8)$$

Here, $\mu_j$ is the weight amount of the j-th (j=1, 2, ..., M) delay line of the optical pulse shaper 521. $M \leq T_3/T_1$ is desired. Here, where $T_3=T_1$ for simplicity, consider $M \leq T_1/2T_3$. The following is a case where x(t) is described by a time discretized by the sampling time $T_1$.

Formula 9

$$x_i(n) = f\{\sum_{j=1}^{M} \alpha\Omega_{ij} x_i(n-1) + m_i u(n-1)\} \quad (9)$$

Here, $\Omega_{ij}$ is as follows.

Formula 10

$$(\Omega_{ij})_{\substack{1 \leq i \leq N \\ 1 \leq j \leq N}} = \begin{bmatrix} \mu_1 & \mu_2 & \Lambda & \mu_M & 0 & & \Lambda & 0 & \Lambda & & 0 \\ 0 & \mu_1 & \mu_2 & \Lambda & \mu_M & 0 & \Lambda & 0 & & & \\ 0 & 0 & \mu_1 & & \Lambda & \mu_M & O & M & & O & M \\ M & M & O & O & O & & O & 0 & & O & 0 \\ 0 & 0 & \Lambda & 0 & \mu_1 & \mu_2 & \Lambda & \mu_M & 0 & \Lambda & 0 \end{bmatrix} \quad (10)$$

It can be understood from the symmetry with Formula (1) that this configuration performs the coupling of the intermediate layer in the RC circuit. The number of neurons at this time corresponds to N. Each element of the coupling constant can be set by the weight amount $\mu_i$ of each delay line. As compared to the first embodiment, this configuration can set the matrix $\Omega_{ij}$ in a relatively optional manner, which thus has a high capacity to express RC. The operation of the output layer is the same as that in the first embodiment.

Figure 7:
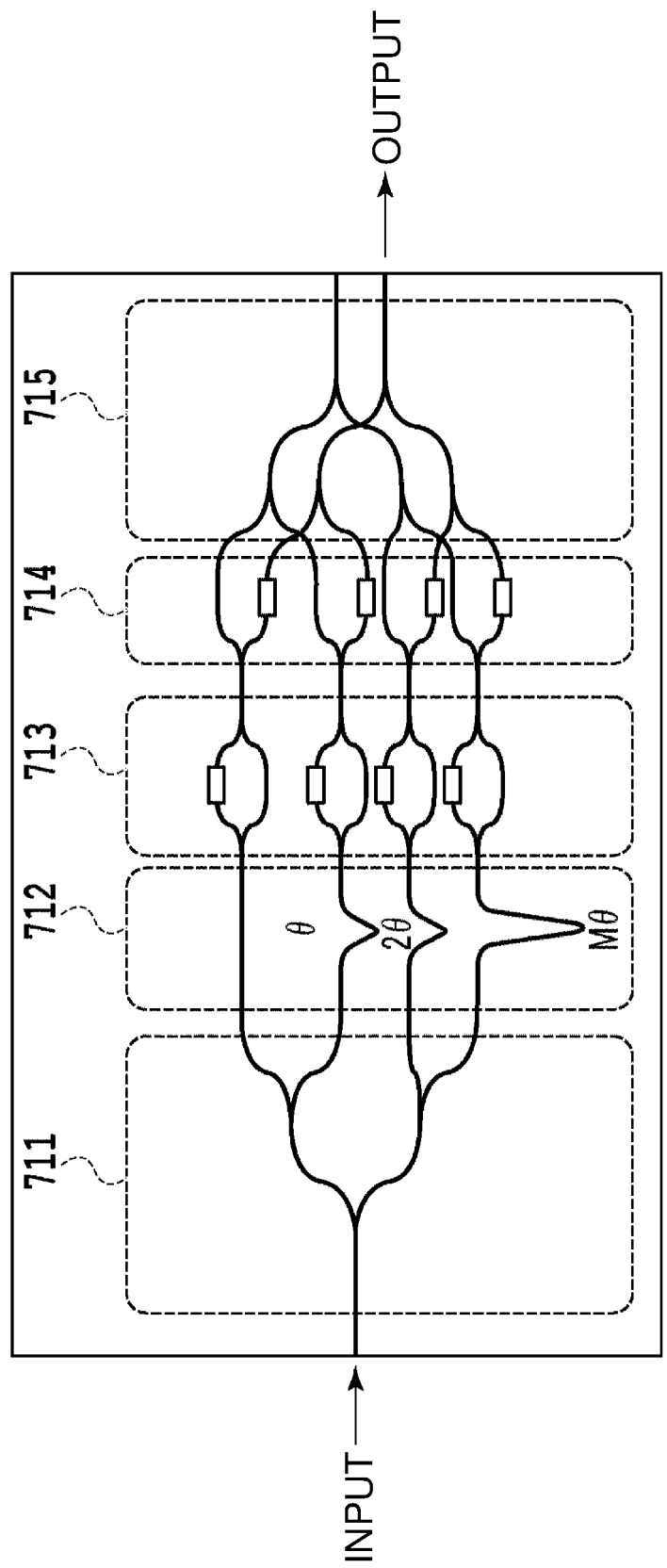
FIG. 7 is a view showing a configuration example of a variable optical filter by an optical waveguide formed on a substrate.

A specific implementation method of the FIR filter in the optical domain as described above will be explained. FIG. 7 shows a configuration example of a variable optical filter by an optical waveguide formed on a substrate. In this element, individual ends of a 1:N-branched optical splitter 711 are connected to a delay line group 712 consisting of N delay lines having delay amounts differing by θ, and each delay line is loaded with a variable optical attenuator (VOA) group 713 consisting of N VOAs and a phase shifter group 714 consisting of N phase shifters (see Non-Patent Literature 3). By these elements, the input light is weighted with respect to each time signal and then multiplexed by an optical coupler 715. Thereby, an operation equivalent to that of the FIR filter shown in FIG. 6(b) can be performed.

Although an optical waveguide is used here to form the FIR filter, a spatial optical system can also be used to obtain a configuration equivalent to that in FIG. 6(b). In this case, portions corresponding to the VOA 713 and the phase shifter 714 can be implemented using a spatial light modulator (SLM) or an MEMS mirror.

Learning Method

In RC, a variable to be learned is only $\omega_i$, and several methods are available for determining the variable. As an example, a least mean square (LMS) method described by Formulas (11) and (12) will be explained here, but the present invention is not limited thereto, and the effect of the present invention can be obtained regardless of the algorithm of learning.

Formula 11

$$\omega_i^r(n+1) = \omega_i^r(n) + k(d^r(n) - y^r(n))x_i^r(n) \quad (11)$$

Formula 12

$$\omega_i^i(n+1) = \omega_i^i(n) + k(d^i(n) - y^i(n))x_i^i(n) \quad (12)$$

Here, d(n) is a teacher value, and k is a coefficient for determining how much to move in the slope direction. The superscripts r and i indicate the real and imaginary parts for each variable. Since this method merely reduces the energy (error from the learning value) toward the neighboring local minimum, the global search is difficult in this state. Methods for giving an approximation to the global minimum solution include an annealing method. For this too, various methods are proposed. For example, as a function for the time step n, k may be given as follows.

Formula 13

$$k(n+1) = k_{min} + h(k(n) - k_{min}) \quad (13)$$

Here, $k_{min}$ and h are constants.

Learning Example

As a learning example according to the present invention, time series data approximation learning of a complex input and output signal will be shown. NARMA10 task, which is normally used as a benchmark for nonlinear time series learning, is performed to examine whether a teacher signal can be reproduced. The optical system of the optical signal processing device according to the first embodiment of the present invention is reproduced in the simulation to compute whether the output of NARMA10 described by Formula (14) can be approximated.

Formula 14

$$y(n+1) = 0.3y(n) + 0.05y(n)\sum_{i=0}^{9} y(n-i) + 1.5u(n)u(n) + 0.1 \quad (14)$$

Here, y(n) is a time series signal to be predicted, and u(n) is an input signal. For the nonlinear element, the input signal u(n) is generated by Formula (15) below.

Formula 15

$$u(n) = \sin\left(2\pi f_1 \frac{t}{T}\right)\sin\left(2\pi f_2 \frac{t}{T}\right)\sin\left(2\pi f_3 \frac{t}{T}\right) \quad (15)$$

Here, $f_1$, $f_2$, and $f_3$ are 2.11, 3.73, and 4.33, respectively. The modulation period $T_2$ of the mask function m(t) is set to $T_2=T_1/100$, and the circulation time $T_3$ is set to $T_3=4T_1=400T_2$. For the nonlinear element, an SOA is used and its nonlinear dynamics are computed by a method disclosed in Non-Patent Literature 4. The initial values of the weight vector $\omega_i$ in the output layer to be learned are all set to 1. Furthermore, α, which is the constant for determining the mutual coupling matrix in the intermediate layer of the network, is selected to be 1.2. As α increases, the dynamics that constitute the reservoir become chaotic. Accordingly, α=1.2 is set so as to maximize the reservoir network within a range of showing no chaotic property. Setting in this manner increases storage capacity of the reservoir network, exhibiting an excellent function of improving learning performance for tasks including past information as in NARMA.

Figure 8A:
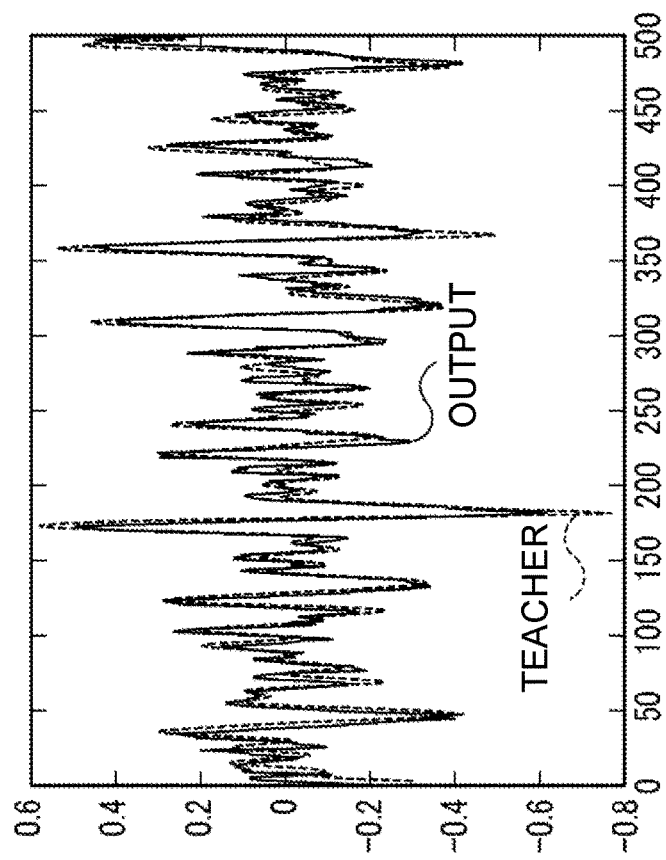
FIG. 8(a) is a view of one example showing real parts of a teacher signal and a complex output signal after learning.
Figure 8B:
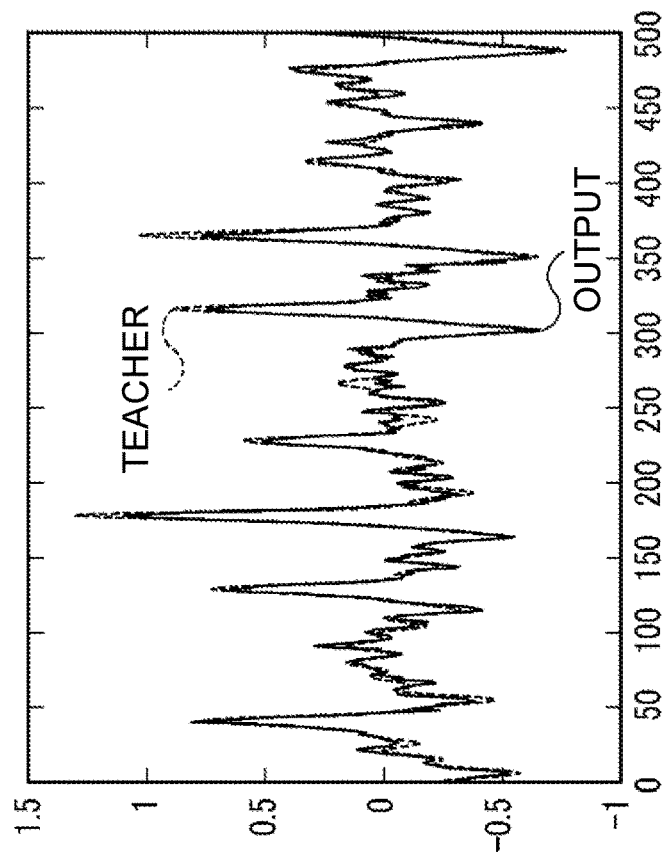
FIG. 8(b) is a view of one example showing imaginary parts of a teacher signal and a complex output signal after learning.

The learning is performed using an LSM method. A teacher signal of 1000 symbols is learned and then 1000 symbols are estimated. FIGS. 8(a) and (b) show one examples of the real and imaginary parts of the teacher signal and the complex output signal after learning. Here, the learning is performed under the condition where the number of nodes N=100. As shown in FIGS. 8(a) and (b), the waveform of the complex output signal after learning gives a good approximation to the waveform of the teacher signal, and the normalized mean square error (NMSE) described by Formula (15) is 0.01, which is sufficiently small. Therefore, by using the configuration of the present invention, learning of a complex signal can be performed.

REFERENCE SIGNS LIST 100, 400 RC circuit
101, 401 Input layer
102, 402 Intermediate layer
103, 403 Output layer
200, 500 Optical signal processing device
210, 220, 510, 520 Electric signal processing circuit
211, 511 Laser light source
212, 512 Optical modulator
213, 513 Optical transmission path
214, 218, 514, 518 Optical coupler
215, 515 Optical circulation unit
216, 516 Variable attenuator
217, 517 Nonlinear response element
219, 519 Coherent optical receiver
521 Optical pulse shaper

The invention claimed is:

1. An optical signal processing device comprising:
a light source generating an optical signal;
first optical modulation means for modulating at least one of intensity and phase of the optical signal at a first modulation period to generate a complex input signal;
second optical modulation means for modulating the complex input signal in a time domain at a second modulation period that is shorter than the first modulation period;
an optical circulation unit in which the modulated complex input signal circulates at a predetermined delay length;
optical multiplex means for joining the modulated complex input signal in the optical circulation unit;
a nonlinear response element giving nonlinearity to the optical signal circulating in the optical circulation unit;
variable optical modulation means for modulating the optical signal circulating in the optical circulation unit;
optical branch means for branching part of the optical signal circulating in the optical circulation unit;
optical reception means for demodulating branched light output from the optical branch means to obtain a complex intermediate signal; and
a signal processing circuit for weighting each of real and imaginary parts of the complex intermediate signal with any coupling weight and taking a sum to obtain a complex output signal,
wherein the signal processing circuit changes the coupling weight so as to reduce an error between the complex output signal and a teacher signal.

2. The optical signal processing device according to claim 1, wherein the modulated complex input signal is a product of a complex vector having a period identical to the first modulation period and the complex input signal.

3. The optical signal processing device according to claim 1, wherein the predetermined delay length is 10 times or more the second modulation period.

4. The optical signal processing device according to claim 1, further comprising optical pulse shaping means for optionally shaping an optical pulse of the optical signal circulating in the optical circulation unit.

5. The optical signal processing device according to claim 4, wherein the optical pulse shaping means comprises:
second optical branch means for N-branching (N is an integer of 2 or more) the optical signal circulating in the optical circulation unit;
N delay lines being connected to each of N branches of the second optical branch means and having different delay lengths;
control means for individually controlling intensity or phase of the optical signal passing through the N delay lines; and
optical multiplex means for joining again the optical signal controlled by the control means.

6. The optical signal processing device according to claim 2, wherein the predetermined delay length is 10 times or more the second modulation period.

7. The optical signal processing device according to claim 2, further comprising optical pulse shaping means for optionally shaping an optical pulse of the optical signal circulating in the optical circulation unit.

8. The optical signal processing device according to claim 3, further comprising optical pulse shaping means for optionally shaping an optical pulse of the optical signal circulating in the optical circulation unit.

* * * * *